Patented Aug. 11, 1953

2,648,684

UNITED STATES PATENT OFFICE 2,648,684

AMINO DERIVATIVES OF DIBENZOFURAN

Wilhelm Wenner, Upper Montclair, N. J., assignor to Hoffmann-La Roche Inc., Nutley, N. J., a corporation of New Jersey No Drawing. Original application October 28, 1949, Serial No. 124,260. Divided and this application November 23, 1951, Serial No. 257,965

7 Claims. (Cl. 260—346.2)

The present invention relates to 2-benzylaminomethyl-dibenzofuran and 2-cyclohexylaminomethyl-dibenzofuran and to the acid addition salts thereof. These compounds are of interest for chemo-therapeutic purposes, and, more particularly, they are useful in combatting fungus infections.

In general, the bases of the invention can be prepared by reacting 2-chloromethyl-dibenzofuran with benzylamine or cyclohexylamine. The reagents can be employed in equimolecular amounts, but it is advantageous to employ at least two mols of the nitrogen base to one mol of 2-chloromethyl-dibenzofuran, the second mol of the nitrogen base serving to bind or neutralize the hydrochloric acid formed in the reaction. The reaction is preferably carried out in the presence of an organic solvent, as for example, ether, ethyl alcohol, benzene, toluene, dioxane, and the like.

The bases of the invention are readily soluble in the common organic solvents, but are practically insoluble in water. They readily form salts with inorganic and organic acids, for example, with hydrochloric acid, hydrobromic acid, sulfuric acid, phosphoric acid, acetic acid, benzoic acid, tartaric acid, oxalic acid, citric acid, salicylic acid, and the like.

The following examples will serve to illustrate the invention.

Example 1

Ten grams of 2-chloromethyl-dibenzofuran and 12 grams of benzylamine were dissolved in 100 cc. of absolute alcohol. The mixture was warmed to 70–80° C. for five hours. The solution was diluted with 500 cc. of ether and 500 cc. of water. The ether layer was separated and extracted with 3 per cent hydrochloric acid. Crystals separated within a short time from the acid extract. The crystals were filtered, and upon recrystallization from water or from alcohol-ether, 2-benzylaminomethyl-dibenzofuran hydrochloride, M. P. 234° C., was obtained.

Example 2

Ten grams of 2-chloromethyl-dibenzofuran were dissolved in 100 cc. of toluene. Eleven grams of cyclohexylamine were added. The mixture was warmed on a steam bath for three hours. It was then filtered from the cyclohexylamine hydrochloride which formed. The filtrate was washed with water and was then extracted with 3 per cent hydrochloric acid. An oil separated from the acid extract and soon crystallized. The crystals were purified by recrystallization from water. The 2-cyclohexylaminomethyl-dibenzofuran hydrochloride thus obtained has an M. P. of 248° C.

This application is a division of my copending application Serial No. 124,260, filed October 28, 1949, now abandoned.

I claim:

1. A compound selected from the group consisting of 2-benzylaminomethyl-dibenzofuran and its addition salts and 2-cyclohexylaminomethyl-dibenzofuran and its acid addition salts.
2. 2-benzylaminomethyl-dibenzofuran.
3. An acid addition salt of the compound of claim 2.
4. A hydrochloride of the compound of claim 2.
5. 2-cyclohexylaminomethyl-dibenzofuran.
6. An acid addition salt of the compound of claim 5.
7. A hydrochloride of the compound of claim 5.

WILHELM WENNER.

References Cited in the file of this patent

Willis, CA (1944), page 739.
Kilpatrick, CA vol. 31 (1937), page 1800.
Gilman, J. Am. Chem. Soc., pp. 2836–2849, vol. 61 (1939).